April 28, 1959  G. A. LYON  2,884,281
WHEEL COVER
Filed Nov. 2, 1956
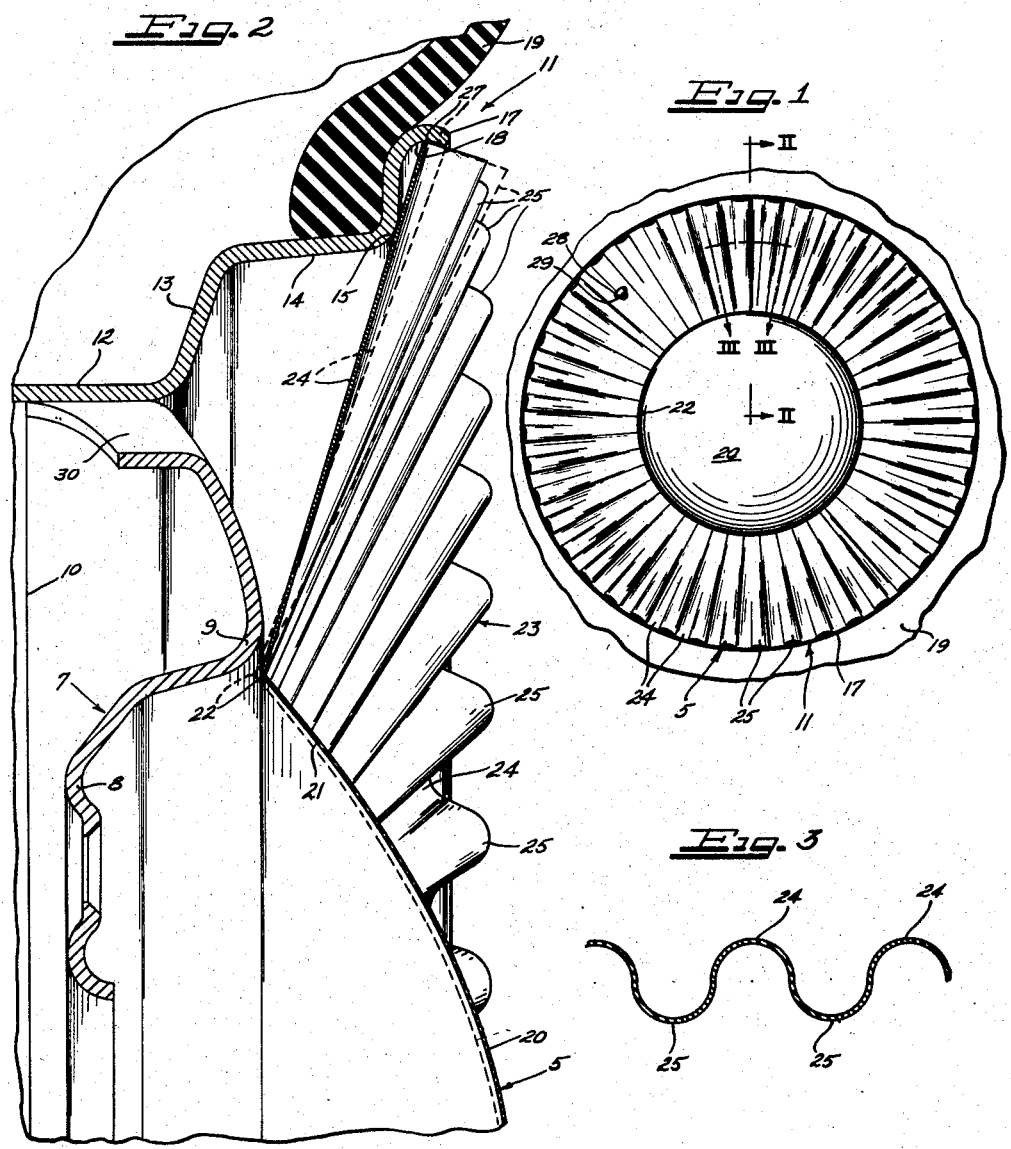
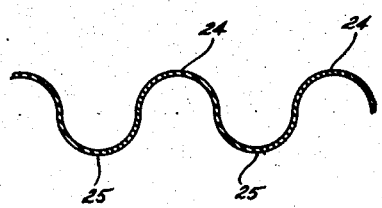
Inventor
GEORGE ALBERT LYON
Attys.

United States Patent Office 2,884,281
Patented Apr. 28, 1959

2,884,281
WHEEL COVER
George Albert Lyon, Detroit, Mich.
Application November 2, 1956, Serial No. 619,983
2 Claims. (Cl. 301—37)

The present invention relates to improvements in wheel structures and more particularly concerns the ornamental and protective covering of the outer sides of vehicle wheels.

An important object of the present invention is to provide an improved wheel structure having a novel cover of unitary one piece, inexpensive construction adapted for snap-on pry-off disposition at the outer side of the wheel.

Another object of the invention is to provide a wheel cover for disposition at the outer side of the wheel and having novel means for retaining the cover in position on the wheel by engagement with the terminal flange of the tire rim of the wheel.

A further object of the invention is to provide a wheel structure including improved means for retaining a cover in position on the wheel and providing further a novel relationship of the cover to the wheel to avoid unintentional displacement of the cover responsive to axially inward pressures or thrust on the crown portion of the cover.

Yet another object of the invention is to provide an improved wheel cover for disposition at the outer side of a vehicle wheel and constructed and arranged to provide for air circulation through the wheel and from behind the cover.

Further objects, features and advantages of the present invention will be readily apparent from the following detailed description of a preferred embodiment thereof taken in conjunction with the accompanying drawing in which:

Figure 1 is an outer side elevational view of a vehicle wheel structure embodying features of the invention;

Figure 2 is an enlarged fragmentary radial sectional detail view taken substantially on the line II—II of Figure 1; and Figure 3 is an enlarged fragmentary sectional detail view taken substantially on the line III—III of Figure 1.

A wheel cover 5 embodying features of the present invention is adapted to be applied in covering disposition over the outer side of a vehicle wheel such as an automobile wheel including a wheel body 7 of preferably the disk spider type including a dished central bolt-on flange 8, an intermediate generally axially outwardly extending annular nose bulge 9 and an outer marginal generally axially inwardly directed attachment flange 10 which is attached in supporting relation to a multi-flanged drop center tire rim 11. The tire rim includes a base flange 12 from which extends an outer generally radially outwardly directed and axially outwardly facing side flange 13 merging with a generally radially inwardly facing and axially outwardly extending intermediate flange 14. At its axially outer side the intermediate flange 14 merges on a juncture shoulder 15 with a terminal flange 17 extending generally radially outwardly and then turned generally axially outwardly and providing in the extremity portion thereof a generally radially inwardly facing groove 18. A pneumatic tire 19 is adapted to be supported by the tire rim.

The wheel cover 5 is made from suitable sheet material possessed of substantial resiliency in the made-up form. Suitable material comprises brass or stainless steel sheet which can be conveniently die pressed or drawn into shape and is susceptible of suitable finishing such as polishing and plating or otherwise.

Centrally the cover 5 has a crown portion 20 which is suitably bulged axially outwardly in order to provide a chamber therebehind for accommodating the usual wheel hub (not shown) about which the bolt-on flange 8 of the wheel body is attached and through which bolt-on flange the hub projects. While the crown portion 20 of the wheel cover may be of various contours rather than the smoothly convex form shown, marginally the crown portion preferably extends to a diameter for overlying the nose bulge 9 of the wheel body. A circular, axially inwardly and radially outwardly sloping side wall 21 defining the perimeter of the crown portion 20 merges convergently on a circular juncture rib 22 with a generally radially and axially outwardly sloping generally annular flexible radially outer cover portion 23 extending from such juncture to a diameter for overlying the radially outer portion of the wheel body 7 and the tire rim 11. At its radially outermost extremity the radially outer cover portion 23 is engageable in retaining relation within the tire rim flange groove 18 with the terminal flange 17.

Cover retaining engagement of the outer edge of the cover portion 23 is facilitated by the construction of the cover portion 23 to provide a uniformly undulating corrugation-fluted structure of the cover portion 23 and more particularly the outer margin thereof. By preference, alternating axially inward and axially outward, radially extending flutes or corrugations 24 and 25, respectively, are provided. At the radially outer ends of the axially inward corrugations 24 generally radially outwardly projecting gripping, cover retaining shoulders 27 are provided which are engageable under resilient generally radially outwardly thrusting more or less biting engagement with the surface of the terminal flange 17 within the groove 18 thereof.

Actually, the corrugations 24 and 25 provide flute-like radially elongated ribs which, by reason of their transverse arched form as best seen in Figure 3, are of substantial stiffness longitudinally so that they quite strongly resist bending. Transversely, that is circumferentially of the cover, however, the several ribs 24, 25 are reasonably resiliently flexible so that the respective side walls of the ribs are relatively flexibly movable toward or away from one another in response to strong flexing forces. This is a valuable feature for enabling press-on, pry-off engagement of the outer ends of the retaining ribs 24 with the rim flange.

In applying the cover 5 to the outer side of the wheel, a valve stem aperture 28 is registered with respect to a valve stem 29 and axially inward pressure applied to the cover for pressing it into retained engagement on the wheel. Initially, of course, the retaining shoulder ends 27 of the ribs 24 extend to a slightly greater diameter than the inside diameter of the groove 18 of the tire rim terminal flange. In response to the axially inward press-on pressure on the crown portion 20 of the cover, the tips of the ribs 24 fulcrum on the tip of the terminal flange 17 while the radially inner ends of the ribs flex about the juncture 22 toward which all of the ribs 24 and 25 taper and fade into the common plane of the cover at such juncture. This action is shown more or less schematically in dash outline in Figure 2. During such tilting or fulcruming or flexing of the holding ribs, which causes them to move toward a more acutely angular diverging relation to the crown side wall portion 21, the sides of the several rib corrugations flex slightly to a compressed condition to accommodate the slight reduction in diameter of the cover at the retaining tips or shoulders 27. Then when the retaining tips 27 have attained a diameter to clear the radially turned in tip of the terminal flange 17, the resilient tension under which the ribs have been placed causes the same to return toward the initial, untensioned condition by expansion of the rib sides and projection of the tips 27 radially outwardly to thrust in retaining gripping tensioned engagement against the terminal flange within the groove 18.

In the assembled position of the cover on the wheel, the outer end portions of the corrugation, retaining ribs 24 preferably engage against the rim shoulder 15 as a stop defining the axially inward position of the cover on the wheel. Thereby the cover is entirely supported by the tire rim and preferably clear of the wheel body 7. This avoids interference with proper seating and retaining of the cover on the wheel in spite of substantial axial variable or tolerances that may be present in the relationship of the tire rim and the wheel body.

However, it is desirable to have the juncture rib 22 of the cover closely enough adjacent to the nose bulge 9 of the wheel body to serve as a seat or stop against undue axially inward flexing of the cover when curbing or like pressure is impressed on the crown portion 20 in service and which might be severe enough to unduly flex the cover and more particularly the retaining ribs 24 so as to interfere with the retaining engagement thereof with the tire rim. In other words, the very limited flexing permitted across the clearance gap between shoulder 22 and the nose bulge 9 enables limited resilient, cushioning yielding of the cover due to curbing pressures, but positively limits undue yielding.

It may also be observed that by virtue of the axially outer corrugation ribs 25 providing substantial axially inwardly opening channels that run out at the terminal flange 17 and more particularly beyond the tip of such terminal flange, air circulation is promoted through the wheel by way of wheel openings 30. Moreover, the passages provided by the ribs 25 enable ready centrifugal discharge of dirt or water that may find its way into the space between the wheel cover and the tire rim. Moreover, by having the intermediate, rib portion 22 of the cover close to the nose bulge 9, gravel or the like is substantially restrained against entry into the hub-accommodating chamber behind the cover crown 20.

Removal of the cover 5 from the wheel can be readily effected by applying a pry-off tool behind the outer margin of the cover and levering the retaining tips 27 free from the terminal flange.

It will be understood that modifications and variations may be effected without departing from the scope of the novel concepts of the present invention.

I claim as my invention:

1. In a wheel structure including a wheel body having an annular generally axially outwardly extending nose bulge and a tire rim supported by the body and having a terminal flange provided with a generally axially outwardly facing shoulder and a turned extremity portion providing a generally radially inwardly opening annular groove, a cover for disposition at the outer side of the wheel including a generally circular cover member having an annular radially outer portion provided with generally radially extending and substantially straight corrugation-like ribs with radially outer ends engageable in press-on, pry-off gripping relation with the terminal flange within said groove and with portions of the ribs radially inwardly from said ends engageable as axial disposition stops with said shoulder, the radially inner ends of the ribs terminating adjacent to the radially inner side of the nose bulge and joining an intermediate portion of the cover closely approaching said nose bulge in slightly spaced relation to serve as an axially inward safety stop, said spaced relation affording clearance for axially inward deflection of said intermediate portion during snap-on and pry-off yielding of the ribs.

2. In a wheel structure as defined in claim 1, said intermediate portion comprising an annular rib and said corrugation-like ribs merging at their radially inner ends into said annular rib.

References Cited in the file of this patent

UNITED STATES PATENTS

| D. 168,313 | Lyon | Dec. 2, 1952 |
| 2,308,618 | Lyon | Jan. 19, 1943 |
| 2,625,440 | Lyon | Jan. 13, 1953 |
| 2,705,172 | Lyon | Mar. 29, 1955 |